(12) United States Patent
Boys et al.

(10) Patent No.: US 12,214,519 B2
(45) Date of Patent: Feb. 4, 2025

(54) SAW APPARATUS WITH HYDRAULIC TENSIONING

(71) Applicant: Deere & Company, Moline, IL (US)

(72) Inventors: Michael Boys, Tokoroa (NZ); James Roworth, Tokoroa (NZ)

(73) Assignee: DEERE & COMPANY, Moline, IL (US)

( * ) Notice: Subject to any disclaimer, the term of this patent is extended or adjusted under 35 U.S.C. 154(b) by 185 days.

(21) Appl. No.: 17/844,473

(22) Filed: Jun. 20, 2022

(65) Prior Publication Data

US 2022/0402160 A1    Dec. 22, 2022

(51) Int. Cl.
| | | |
|---|---|---|
| B27B 17/14 | (2006.01) | |
| A01G 23/091 | (2006.01) | |
| B27B 17/02 | (2006.01) | |
| F16H 7/08 | (2006.01) | |

(52) U.S. Cl.
CPC ............ *B27B 17/14* (2013.01); *A01G 23/091* (2013.01); *B27B 17/02* (2013.01); *F16H 7/08* (2013.01); *F16H 2007/0812* (2013.01)

(58) Field of Classification Search
CPC ......... B27B 17/00; B27B 17/02; B27B 17/06; B27B 17/08; B27B 17/14; A01G 23/083; A01G 23/091; A01G 23/095
See application file for complete search history.

(56) References Cited

U.S. PATENT DOCUMENTS

| | | | | | |
|---|---|---|---|---|---|
| 4,410,056 | A | * | 10/1983 | Pound ................... | B62D 33/07 91/437 |
| 5,709,254 | A | * | 1/1998 | Argue ..................... | B27B 17/12 144/34.1 |
| 6,148,547 | A | * | 11/2000 | Seigneur .............. | A01G 23/091 144/34.1 |
| 6,311,599 | B1 | * | 11/2001 | Lindehall ................ | B27B 17/14 83/819 |
| 7,287,330 | B1 | * | 10/2007 | Riha ....................... | B27B 17/14 30/381 |
| 10,458,445 | B2 | * | 10/2019 | Bauer .................... | E02F 3/3654 |
| 10,760,599 | B2 | * | 9/2020 | King ..................... | F15B 20/004 |
| 11,338,466 | B2 | * | 5/2022 | Falk ........................ | B27B 17/02 |
| 2005/0247359 | A1 | * | 11/2005 | Hiser ...................... | E02F 3/325 137/879 |

* cited by examiner

*Primary Examiner* — Matthew Katcoff
(74) *Attorney, Agent, or Firm* — KLINTWORTH & ROZENBLAT IP LLP

(57) ABSTRACT

A saw apparatus includes a guide bar, a chain driver, and an endless cutting chain trained about the guide bar and the chain driver. A hydraulic chain tensioning apparatus has a hydraulic actuator configured to be driven by a hydraulic power source to act against the guide bar to maintain tension in the cutting chain. A tension release valve is provided between the hydraulic power source and the hydraulic actuator. The tension release valve has a check valve, and a manual override press-button configured to maintain the check valve in an open condition while depressed. The tension release valve has a spring detent configured to maintain the manual override press-button in a depressed condition until selectively released.

13 Claims, 6 Drawing Sheets

SAW APPARATUS WITH HYDRAULIC TENSIONING

CROSS-REFERENCE TO RELATED APPLICATIONS

This application claims priority to New Zealand Application No. 777066, filed Jun. 21, 2021, the entire contents of which are incorporated herein by reference.

STATEMENT OF FEDERALLY SPONSORED RESEARCH AND DEVELOPMENT

Not applicable.

FIELD OF THE DISCLOSURE

The present disclosure relates to a saw apparatus having a hydraulic chain tensioning apparatus.

BACKGROUND OF THE DISCLOSURE

It is known to mount a timber-working head, for example in the form of a harvesting head, to a forestry work machine to perform a number of functions in connection with timber. Such heads, depending on the configuration, may be used to grapple and fell a standing tree, process the felled tree by delimbing and possibly debarking the stem, and cutting the stem into lengths using at least one chainsaw.

It is desirable to maintain tension on the chain of the chainsaw for proper operation. Automatic tensioning devices are known, typically utilising a hydraulically driven piston to press against a component holding the saw bar (about which the chain is trained) to achieve the desired tension. One or more valves are used to manage hydraulic fluid flow and pressure within the system, however there is a need to improve the functionality provided by such valves—for example ease of manual override to assist in performing maintenance or replacement of parts.

It is an object of the present invention to address the foregoing problems or at least to provide the public with a useful choice.

Further aspects and advantages of the present invention will become apparent from the ensuing description which is given by way of example only.

SUMMARY OF THE DISCLOSURE

According to an exemplary embodiment of the present disclosure there is provided a saw apparatus comprising: a guide bar; a chain driver; an endless cutting chain trained about the guide bar and the chain driver; a hydraulic chain tensioning apparatus, comprising: a hydraulic actuator configured to be driven by a hydraulic power source to act against the guide bar to maintain tension in the cutting chain; a tension release valve between the hydraulic power source and the hydraulic actuator, wherein the tension release valve comprises: a check valve; a manual override press-button configured to maintain the check valve in an open condition while depressed, wherein the tension release valve comprises a spring detent configured to maintain the manual override press-button in a depressed condition until selectively released.

According to an exemplary embodiment there is provided a timber-working device, comprising a frame, and a saw apparatus mounted to the frame, wherein the saw apparatus is substantially as herein described. The timber-working device may comprise at least one pair of arms pivotally attached to the frame and configured to be controlled to grasp at least one tree stem. The timber-working device may comprise a feed mechanism configured to feed the at least one stem relative to the frame.

In examples, the check valve comprises a check valve closing member configured to be moveable relative to a valve seat. In examples the tension release valve comprises a button shaft extending from the press-button, such that in use the button shaft acts against the check valve closing member when the press-button is depressed in order to drive the check valve closing member off the valve seat. In examples the check valve closing member is spring loaded towards a closed condition.

In examples the check valve closing member comprises a longitudinal bore having a narrow portion at an end proximal the button shaft. In examples an internal ball is provided within the longitudinal bore, held proximal the narrow portion by a retention feature. In examples the check valve closing member is configured such that the internal ball has limited movement between a seated position against the narrow portion and a released position against the retention feature.

In examples the button shaft comprises a drive pin configured to be received in the narrow portion, wherein the drive pin extends in a longitudinal direction beyond a bearing surface of the button shaft configured to act against the check valve closing member in use. In examples the tension release valve is configured such that the drive pin acts against the internal ball before the bearing surface of the button shaft acts against the check valve closing member when the press-button is depressed.

In examples the check valve is a ball check valve comprising a closing member in the form of a ball. In examples the ball is spring loaded towards a closed condition. In examples the manual override press-button acts against the ball to open the check valve.

In examples the tension release valve comprises a check valve body comprising an inner bore in which the check valve is provided, and at least one channel on an exterior surface of the check valve body. In examples the check valve body is received in a recess having a base surface acting as a valve seat, the base surface having a port in fluid communication with the hydraulic actuator. In examples at least one spring biases the check valve body towards the base surface. In examples the tension release valve is configured such that when pressure at the port exceeds a second predetermined threshold the check valve body is lifted from the base surface to permit fluid flow through the at least one channel on the exterior surface of the check valve body.

The above and other features will become apparent from the following description and the attached drawings.

BRIEF DESCRIPTION OF DRAWINGS

The detailed description of the drawings refers to the accompanying figures in which.

DETAILED DESCRIPTION

Figure 1:
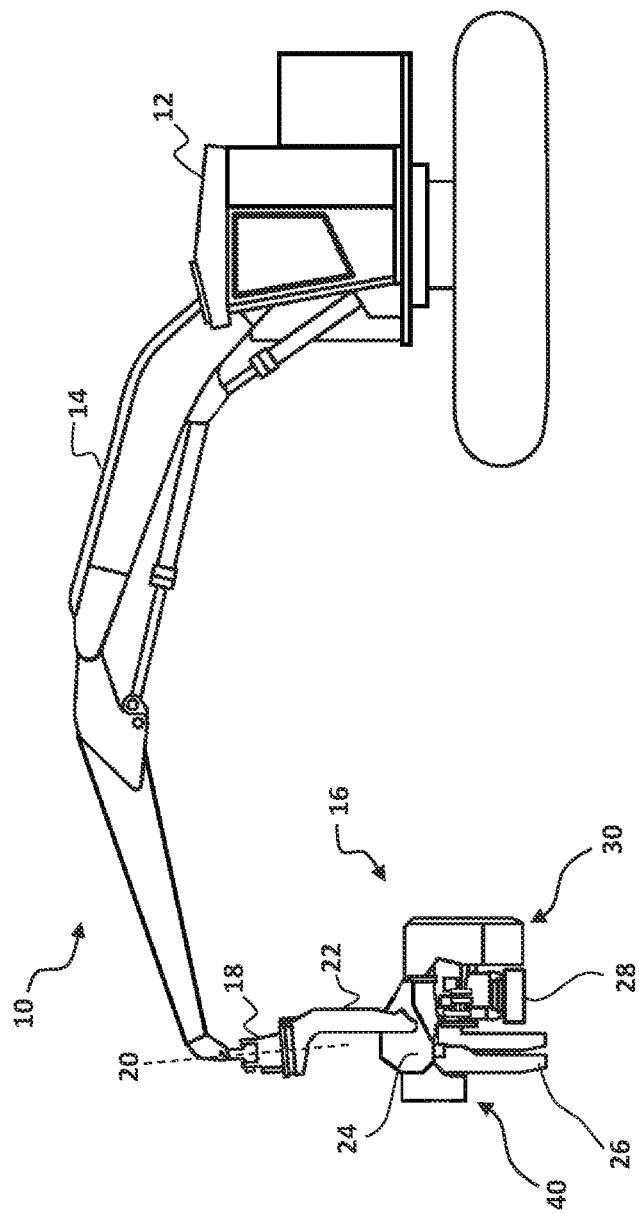
FIG. 1 is a side view of an exemplary timber-working system comprising an exemplary forestry head.

FIG. 1 illustrates a timber-working system comprising a carrier 10 for use in forest harvesting. The carrier 10 comprises an operator cab 12 from which an operator (not shown) controls the carrier 10. The carrier 10 further comprises a boom assembly 14, to which a timber-working device in the form of a forestry head 16 is connected.

Connection of the head 16 to the boom assembly 14 comprises a rotator 18, configured to rotate the head 16 about the generally vertical axis of rotation marked by dashed line 20. A tilt bracket 22 further allows rotation of the head 16 between a prone position (as illustrated) and a standing position.

The head 16 comprises a frame 24 to which the tilt bracket 22 is pivotally attached. Right hand (RH) and left hand (LH) delimb arms 26 are pivotally attached to the frame 24, as are opposing RH and LH feed arms 28. RH and LH feed wheels 30 are attached to the respective RH and LH feed arms 28, which together with RH and LH frame-mounted feed wheels (not illustrated) may be controlled to feed one or more stems (not illustrated) along a longitudinal feed axis of the head 16. It should be appreciated that while the head 16 is described as having two frame-mounted feed wheels, in exemplary embodiments the head may have one frame-mounted feed wheel, or none, as known in the art. The arm and frame mounted feed wheels may collectively be referred to as the 'feed mechanism.' It should be appreciated that reference to the feed wheels is intended to comprise the hydraulic rotary drives propelling them. A measuring wheel may be used to measure the length of the stem as it passes.

Saw apparatus in the form of a main chainsaw 30 is attached to the frame 24. In examples, a topping chainsaw 40 may be provided at the other end of the head 16. The main saw 30 is typically used to fell a tree when the head 16 is in a harvesting position, and to buck stems into logs in the processing position of the head 16. The topping saw 40 may be used to cut off a small-diameter top portion of the stem(s) to maximize the value recovery of the trees.

Figure 2:
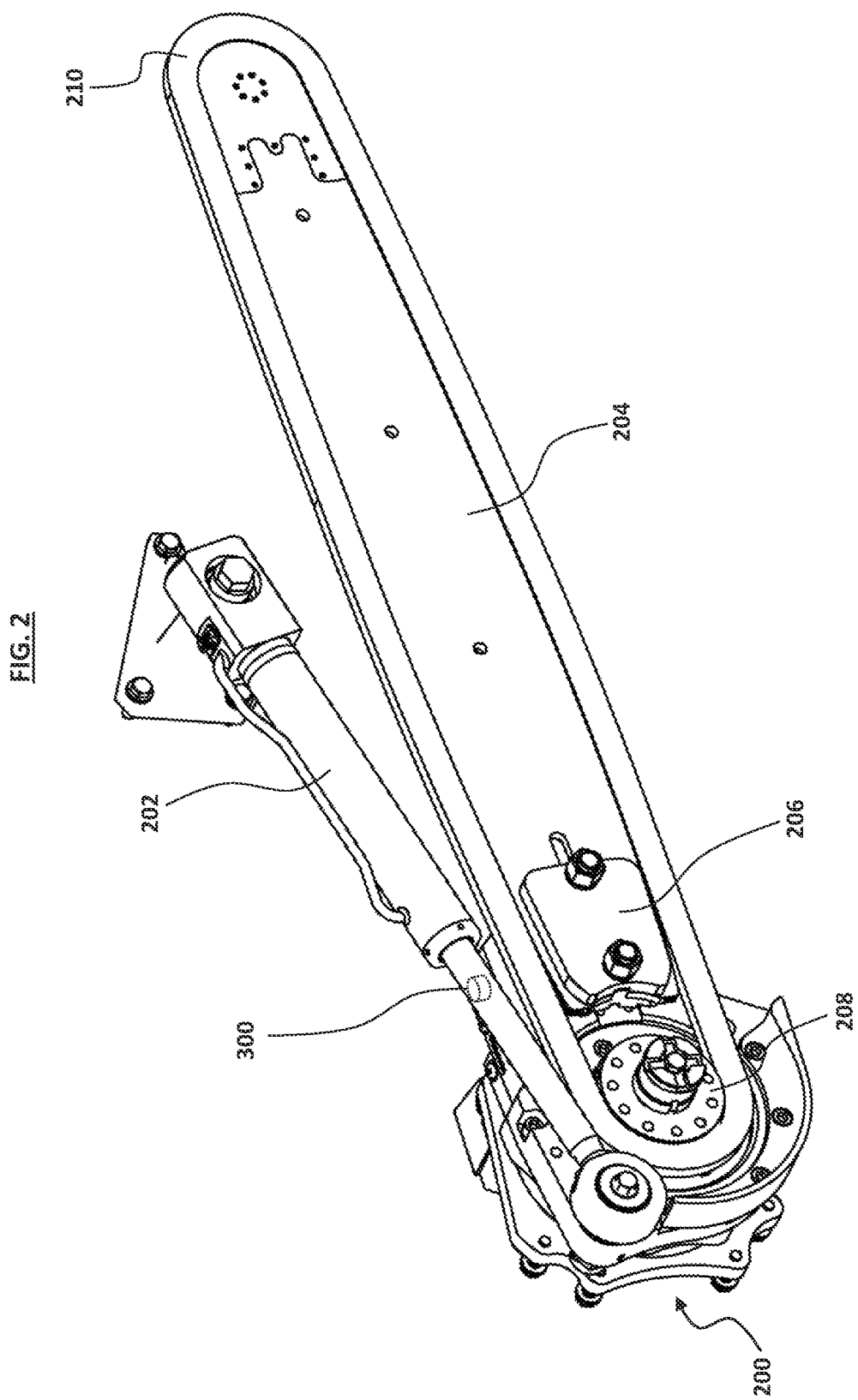
FIG. 2 is a perspective view of an exemplary chain saw unit of the forestry head.

FIG. 2 shows an exemplary saw unit 200, for example to be used as a topping chainsaw 40. The saw unit 200 is pivotally connected to the frame (or an intermediary component), and pivoted between a stowage position (e.g. retracted into a saw housing), and a deployed position during a sawing event (e.g., felling, bucking) using pivot cylinder 202. A saw guide bar 204 is held by a bar holder unit 206 relative to a drive sprocket 208. An endless chain 210 is trained about the sprocket 208, rotation of which drives the chain 210 around the guide bar 204. The drive sprocket 208 is attached to an output shaft of a drive device in the form of a hydraulic motor, for controlled rotation of the sprocket 208.

In order to maintain tension on the chain 210, a hydraulic chain tensioning apparatus is provided to push the bar holder unit 206 away from the drive sprocket 208—details of which will be described further herein. A tension release valve 300 is provided to manage flow of hydraulic fluid under various conditions.

Figure 3:
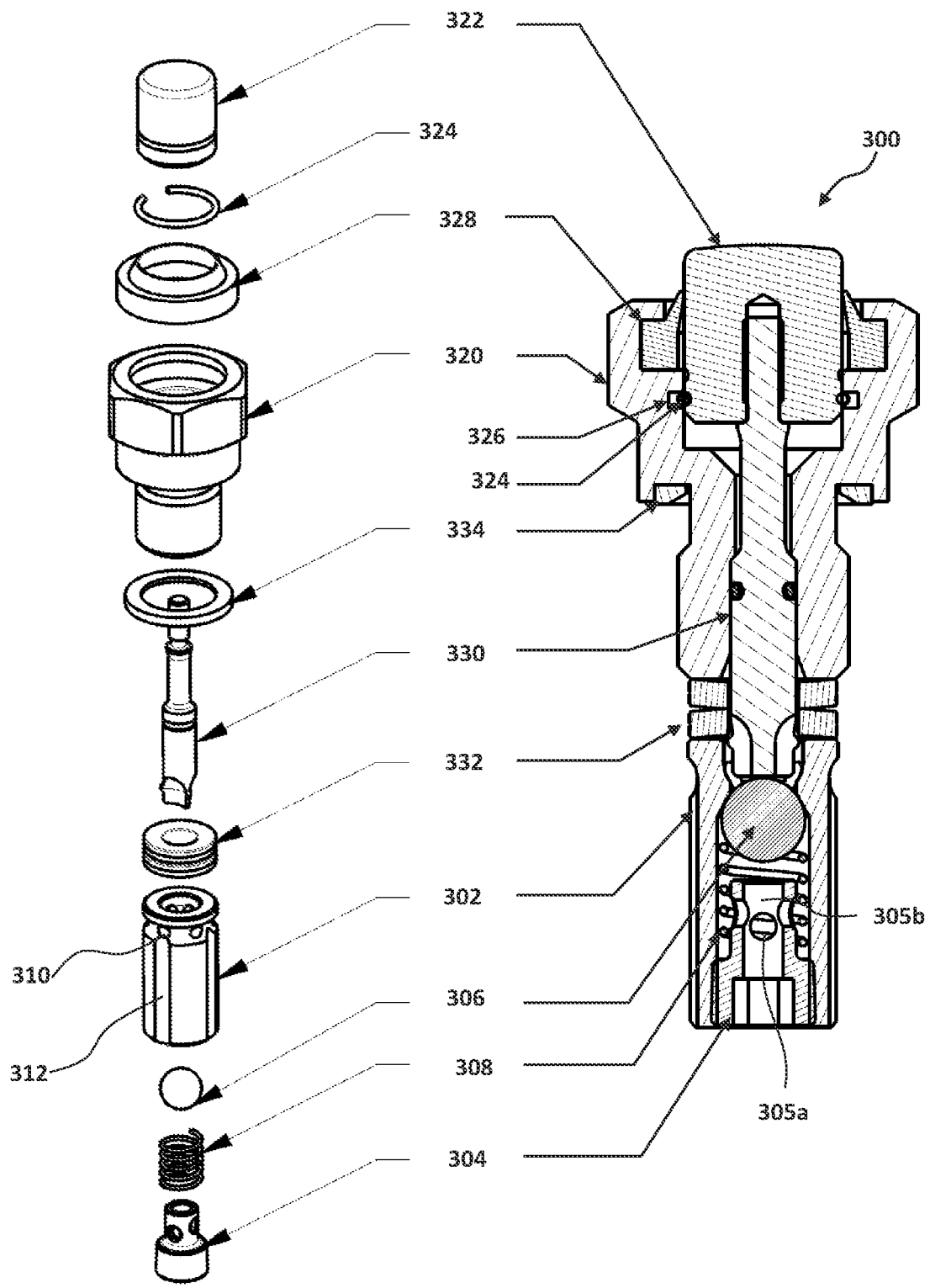
FIG. 3 shows an exemplary tension release valve for use in the chain saw unit.

Referring to FIG. 3, a first embodiment of the tension release valve 300 has a check valve assembly comprising check valve housing 302, a check valve retainer 304 (having a longitudinal bore 305a and a plurality of lateral ports 305b), a check valve ball 306, and check valve spring 308. The check valve housing 302 comprises lateral ports 310 between an external surface of the housing and an inner bore of the housing. The check valve housing 302 further comprises external relief channels 312 on the exterior surface.

The tension release valve 300 has a manual override press-button assembly comprising button housing 320, button 322, and button detent spring 324 located in a detent groove 326 provided in an inner bore of the button housing 320. A button wiper seal 328 is also provided in the inner bore of the button housing 320. A button shaft 330 extends from the button 322 towards the check valve ball 306. One or more springs (for example spring washers 332) are provided between the check valve housing 302 and button housing 320, and an external button housing seal 334 is provided on the exterior of the button housing 320.

Figure 4:
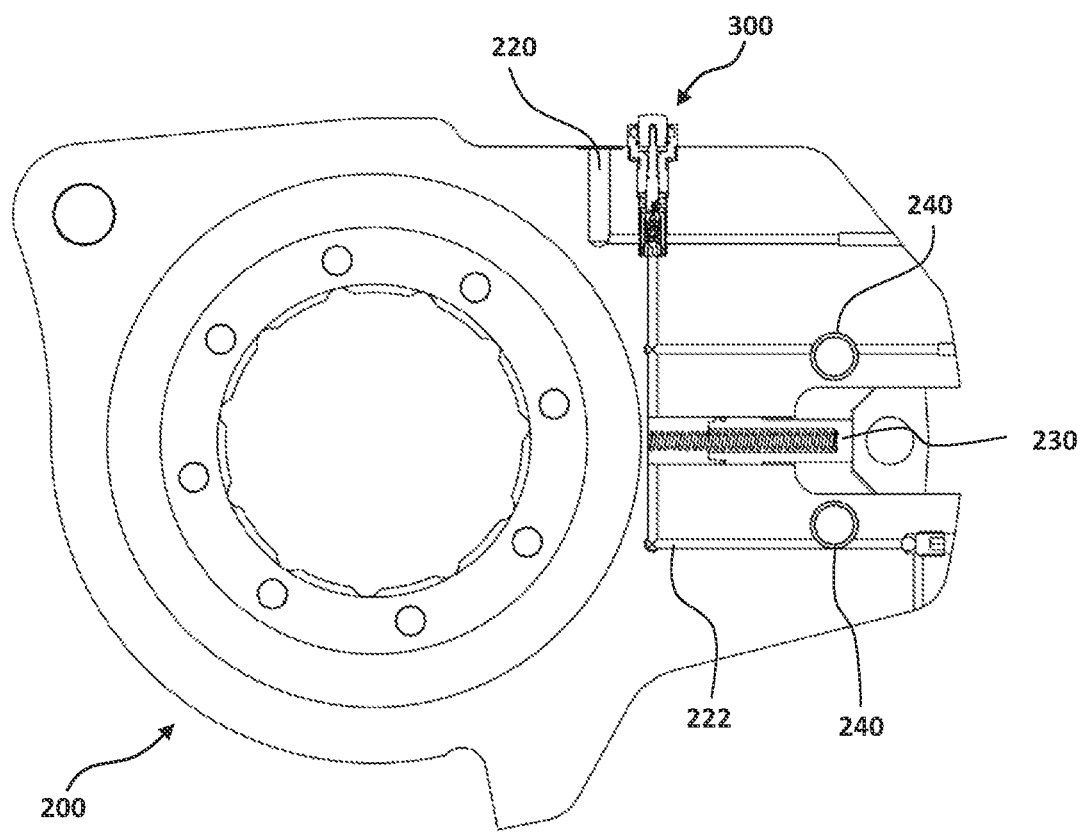
FIG. 4 shows a cross-sectional view of a portion of the saw unit and tension release valve

Referring to FIG. 4, a first hydraulic line 220 leads from a hydraulic power source to the tension release valve 300 (installed within a valve cavity of the saw unit 200). A second hydraulic network 222 leads from the tension release valve 300 to a tension piston 230 and clamp pistons 240. The tension piston 230 is configured to be driven by the resulting pressure to act against bar holder 206 and tension the chain 210 (see FIG. 2). The clamp pistons 240 are configured to act against the bar holder 206 in a direction perpendicular to that of the tension piston 206 in order to restrict movement of the bar holder 206 to that provided the tension piston 206.

Figure 5A:
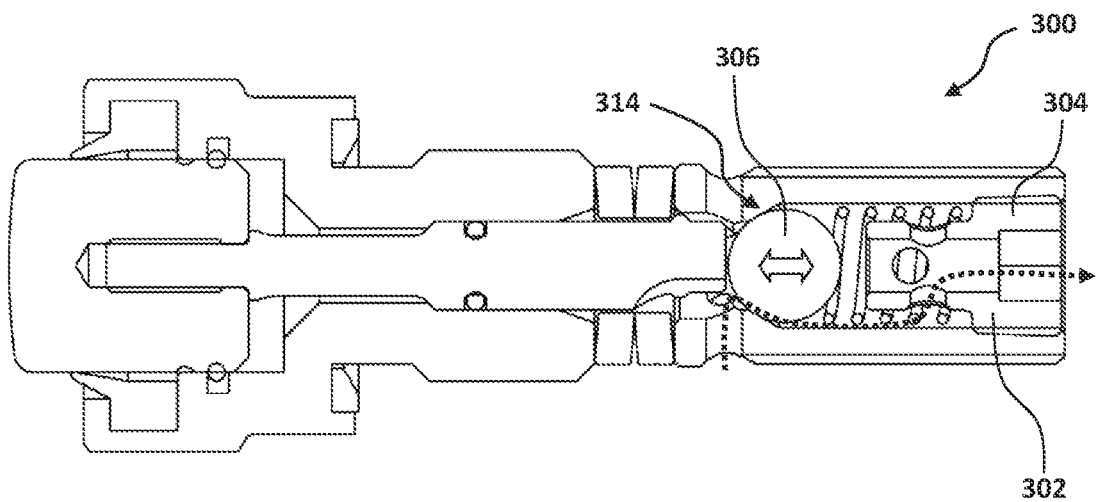
FIG. 5A shows the tension release valve in a first operating condition.

Referring to FIG. 5A, during normal operation pressurized hydraulic fluid flows into the tension release valve 300 from the first hydraulic line 220. The resulting pressure forces the check valve ball 306 off its seat 314 to permit flow through the check valve retainer 304 to the second hydraulic network 222 (it should be noted that FIG. 5A shows the check valve ball 306 in a seated position).

There are circumstances in which the bar holder 206 is forced towards the sprocket 208 during operation—for example, in the event of the chain 210 becoming pinched. This results in the bar holder 206 pressing against the tension piston 230 and attempting to force it back. The resulting pressure in the second hydraulic network 222 acts against the check valve ball 306 to close the check valve (i.e., hold the check valve ball 306 in the position shown in FIG. 5A) and therefore restrict movement of the tension piston 230.

Figure 5B:
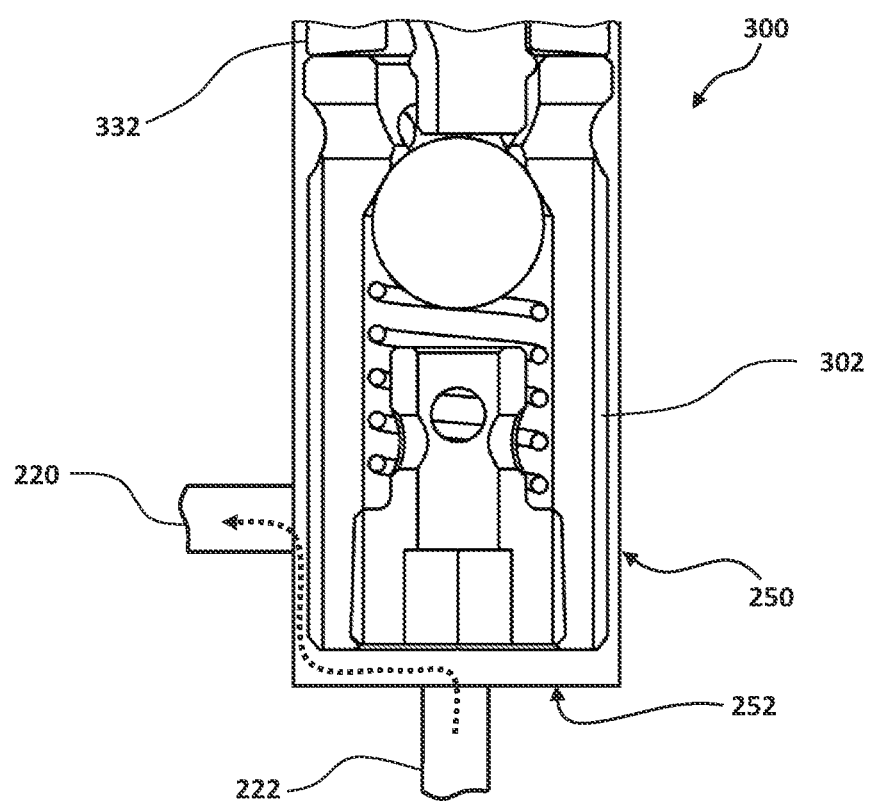
FIG. 5B shows the tension release valve in a second operating condition.

Referring to FIG. 5B, there are circumstances in which pressure within the second hydraulic network 222 may exceed a tolerable pressure level, at which point damage may occur to components such as seals. The tension release valve 300 is configured to provide relief valve functionality in such an event. The tension release valve 300 is received within a valve cavity 250 having a base surface 252 acting as a valve seat. In the event of excess pressure, the bias of the spring washers 332 is overcome and the check valve housing 302 is lifted from the base surface 252. This permits the hydraulic fluid to flow between the check valve housing 302 and the base surface 252 to the channel(s) 312 on the exterior check valve housing 302. The channel(s) 312 provide a fluid pathway through to first hydraulic line 220 in order to relieve the pressure.

Figure 5C:
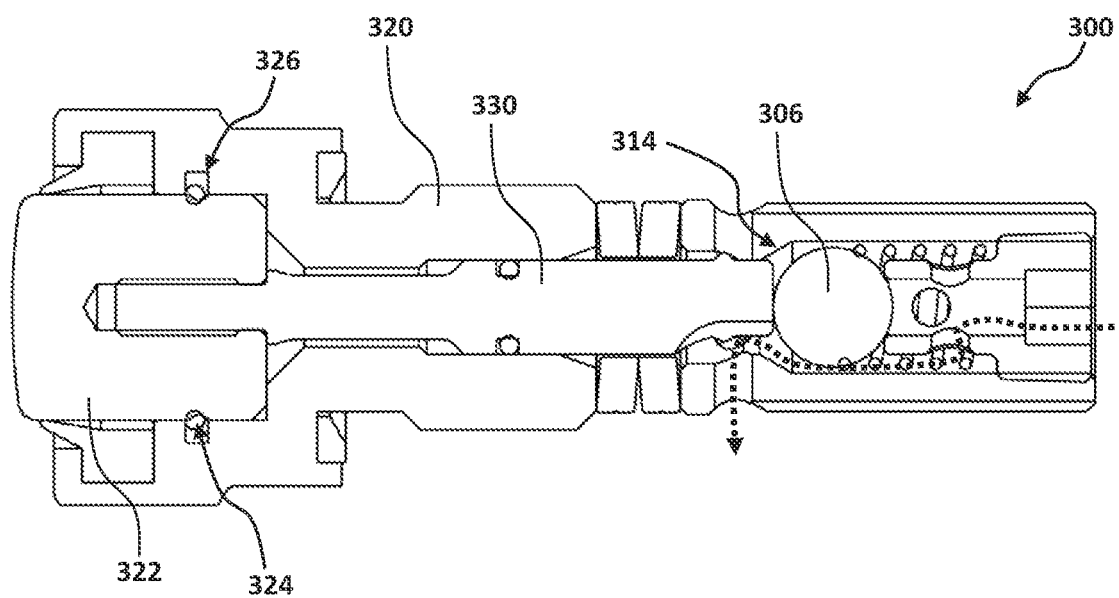
FIG. 5C shows the tension release valve in a manually opened condition.

Referring to FIG. 5C, there are instances in which it is desirable to selectively allow flow through the tension release valve 300 from the second hydraulic network 222, for example to enable a user to push the bar holder 206 towards the sprocket 208 to assist in changing of the guide bar 204 and/or chain 210 (i.e. release tension on the chain 210). Depression of the button 322 drives the button shaft 330 towards the check valve ball 306, moving the check valve ball 306 off its seat 314 to open the tension release valve 300. The spring detent 324 engages with the button 322 to maintain the button 322 in a depressed condition (as shown in FIG. 5C), until pressed again to disengage the spring detent 324.

Figure 6A:
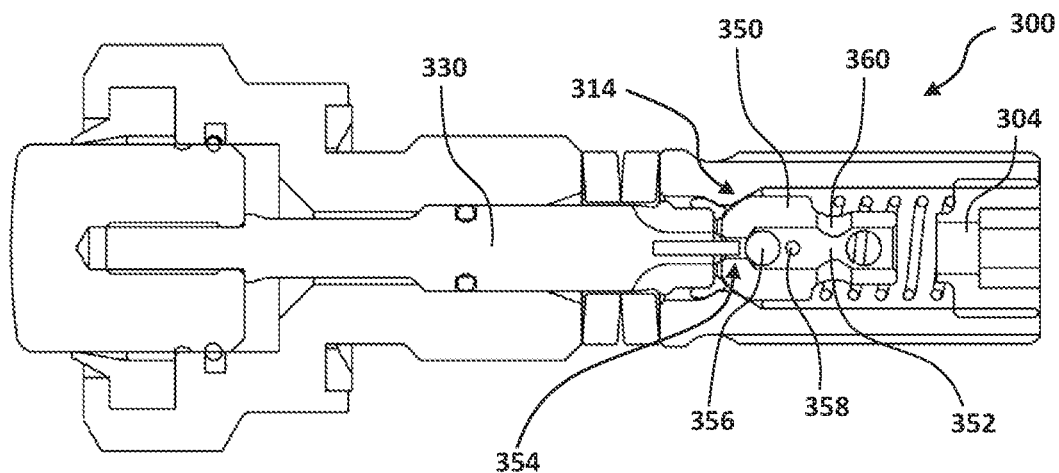
FIG. 6A shows a cross-sectional view of a second exemplary tension release valve.
Figure 6B:
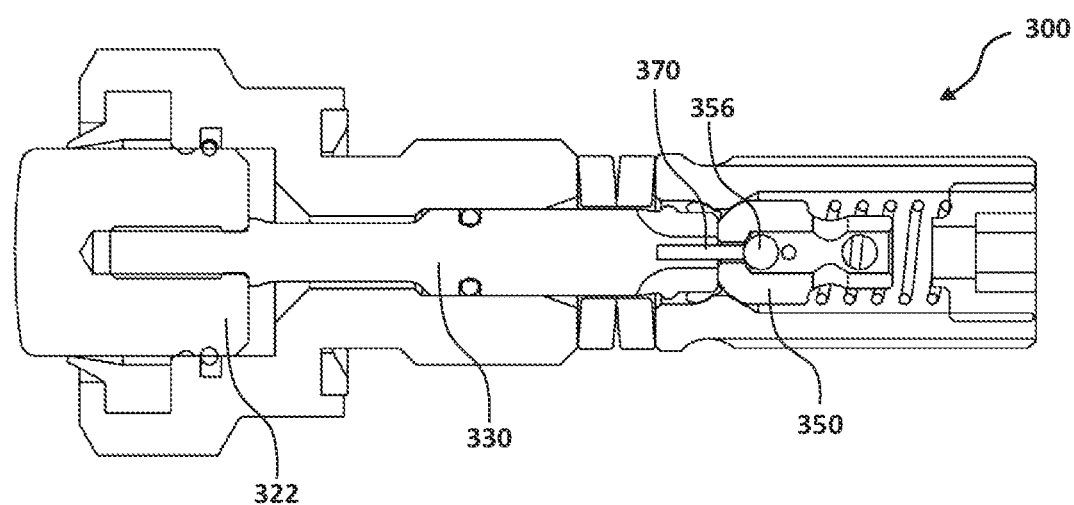
FIG. 6B shows the second tension release valve in a first stage of being manually opened.
Figure 6C:
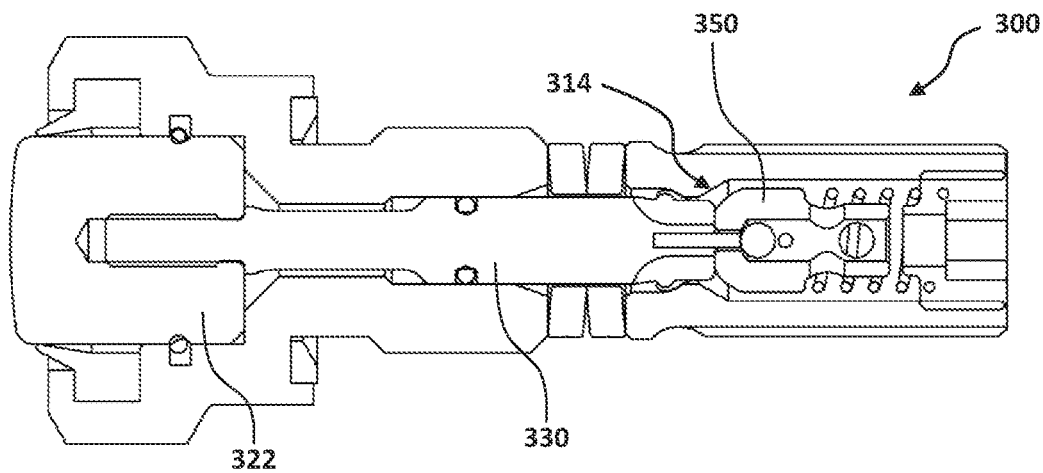
FIG. 6C shows the second tension release valve in second stage of being manually opened.

FIG. 6A-6C illustrate a second embodiment of the tension release valve 300. Referring to FIG. 6A, in this embodiment, the check valve assembly comprises a check valve closing member 350 in place of the check valve ball 306. The closing member 350 comprises a longitudinal bore 352 having a narrow portion 354 at an end proximal the button shaft 330. An internal ball 356 is provided within the longitudinal bore 352, held proximal the narrow portion 354 by a retention feature (e.g. retention pin 358). The internal ball 356 has limited movement between a seated position against the narrow portion 354 and a released position against the retention pin 358. The diameter of the longitudinal bore 352 is greater than the diameter of the internal ball 356 to enable fluid flow through the longitudinal bore 352 around the internal ball 356. Lateral ports 360 allow flow to and from the longitudinal bore 352 when the closing member 350 is seated against check valve retainer 304.

The second embodiment of the tension release valve 300 operates in a similar manner to that described with reference to FIGS. 5A and 5B. During normal operation pressurized hydraulic fluid flows into the tension release valve 300 from the first hydraulic line 220. The resulting pressure forces the closing member 350 off its seat 314 to permit flow through the check valve retainer 304 to the second hydraulic network 222. When the bar holder 206 is forced towards the sprocket 208 during operation, the resulting pressure in the second hydraulic network 222 acts against the closing member 350 to close the check valve 300.

Referring to FIGS. 6B and 6C, the second embodiment of the tension release valve 300 comprises a pin 370 projecting from the button shaft 330 into the narrow portion 354 of the longitudinal bore 352 of the closing member 350. As the button 322 is depresses, the button shaft 330 drives the pin 370 into contact with the internal ball 356 (as shown in FIG. 6B). Lifting the internal ball 356 away from the narrow portion 354 of the longitudinal bore 352 allows a small flow through the narrow portion 354 to equalize the pressure on either side of the closing member 350. This reduces the force required to fully depress the button 322 so the button shaft 330 against the closing member 350 and lift it off the seat 314 proper.

No admission is made that any reference disclosed herein constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the field of endeavour, in New Zealand or in any other country.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps.

Embodiments described herein may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the scope of the disclosure and without diminishing its attendant advantages. It is therefore intended that such changes and modifications be included within the present invention.

Embodiments have been described by way of example only and it should be appreciated that modifications and additions may be made thereto without departing from the scope thereof.

What is claimed is:

1. A saw apparatus comprising:
   a guide bar;
   a chain driver;
   an endless cutting chain trained about the guide bar and the chain driver; and
   a hydraulic chain tensioning apparatus, comprising:
      a hydraulic actuator configured to be driven by a hydraulic power source to act against the guide bar to maintain tension in the cutting chain; and
      a tension release valve between the hydraulic power source and the hydraulic actuator, wherein the tension release valve comprises:
         a check valve; and
         a manual override press-button configured to maintain the check valve in an open condition while depressed, wherein the tension release valve comprises a spring detent configured to maintain the manual override press-button in a depressed condition until selectively released.

2. The saw apparatus of claim 1, wherein the check valve comprises a check valve closing member configured to be moveable relative to a valve seat, and the tension release valve comprises a button shaft extending from the press-button, such that in use the button shaft acts against the check valve closing member when the press-button is depressed in order to drive the check valve closing member off the valve seat.

3. The saw apparatus of claim 2, wherein the check valve closing member comprises a longitudinal bore having a narrow portion at an end proximal the button shaft, and an internal ball provided within the longitudinal bore, held proximal the narrow portion by a retention feature.

4. The saw apparatus of claim 3, wherein the check valve closing member is configured such that the internal ball has limited movement between a seated position against the narrow portion and a released position against the retention feature.

5. The saw apparatus of claim 3, wherein the button shaft comprises a drive pin configured to be received in the narrow portion, wherein the drive pin extends in a longitudinal direction beyond a bearing surface of the button shaft configured to act against the check valve closing member in use.

6. The saw apparatus of claim 5, wherein the tension release valve is configured such that the drive pin acts against the internal ball before the bearing surface of the button shaft acts against the check valve closing member when the press-button is depressed.

7. The saw apparatus of claim 1, wherein the tension release valve comprises a check valve body comprising an inner bore in which the check valve is provided, and at least one channel on an exterior surface of the check valve body.

8. The saw apparatus of claim 7, wherein the check valve body is received in a recess having a base surface acting as a valve seat, the base surface having a port in fluid communication with the hydraulic actuator.

9. The saw apparatus of claim 8, wherein at least one spring biases the check valve body towards the base surface.

10. The saw apparatus of claim 9, wherein the tension release valve is configured such that when pressure at the port exceeds a second predetermined threshold the check valve body is lifted from the base surface to permit fluid flow through the at least one channel on the exterior surface of the check valve body.

11. A timber-working device, comprising:
a frame; and
a saw apparatus mounted to the frame, wherein the saw apparatus comprises:
a guide bar;
a chain driver;
an endless cutting chain trained about the guide bar and the chain driver; and
a hydraulic chain tensioning apparatus, comprising:
a hydraulic actuator configured to be driven by a hydraulic power source to act against the guide bar to maintain tension in the cutting chain; and
a tension release valve between the hydraulic power source and the hydraulic actuator, wherein the tension release valve comprises:
a check valve; and
a manual override press-button configured to maintain the check valve in an open condition while depressed, wherein the tension release valve comprises a spring detent configured to maintain the manual override press-button in a depressed condition until selectively released.

12. The timber-working device of claim 11, comprising at least one pair of arms pivotally attached to the frame and configured to be controlled to grasp at least one tree stem.

13. The timber-working device of claim 12, comprising a feed mechanism configured to feed the at least one stem relative to the frame.

* * * * *